3,126,293
MILLING PROCESS
Justin A. McSheehy, Somerville, and Herbert Soffer, Fanwood, N.J., assignors to American Cyanamid Company, New York, N.Y., a corporation of Maine
No Drawing. Filed Jan. 30, 1961, Ser. No. 85,477
6 Claims. (Cl. 106—309)

This invention relates to and has for its object an improved method for reducing the particle size of insoluble coloring material (i.e., vat dyes and pigments) and more particularly to a method for preparing vat dye and pigment pastes and powders of superior qualities involving a grinding process wherein the vat dyes or pigments (in paste form) are roll milled (pebble or ball milled) in an aqueous slurry with dispersing agents using micro-grinding media in very small amounts.

Vat dyes and pigments, unlike many other classes of coloring materials are not soluble in water. Their successful use in many applications depends on their being in a fine state of division. For pigments, the shade and color value may depend on the particle size. In the case of vat dyes, particle size will influence many application factors, such as the rate of vatting or the degree of migration during pad-steam dyeing.

It is conventional for the purpose of reducing the vat dye or pigment to fine particles to mill them by rolling in a ball mill or in a pebble mill, but known processes have not been satisfactory in that they did not sufficiently reduce the particle size or required too long a period of time to achieve the desired result.

In an effort to overcome this deficiency, it was attempted to mix the coloring material, especially in the case of pigments, with a grinding material such as calcium carbonate or barium sulfate, etc. prior to pebble or ball milling, to complement the action of the rolling pebbles or balls thus to break up agglomerates and grind individual particles to a greater state of subdivision. While this process was somewhat more effective, it resulted in a product which was highly diluted by the grinding material and thus low in tinctorial power.

It was then suggested to mix the insoluble coloring material with salt as a grinding aid so that it could be washed out of the product. It was found that a large excess of salt (usually about 500% by weight of the dye) was necessary to be of any use. Of course, after the milling step the salt had to be removed by washing to render commercially applicable as a coloring material, the milled product. While this process overcame a disadvantage entailed in the prior art procedures, it raised other problems. The large excess of salt reduced the product output of the mill and moreover certain dyes and pigments, even after extended milling periods, were not ground to a sufficiently small particle size. Furthermore, the washing step resulted in the formation of agglomerates which lowered the desirability and the quality of the product.

It is the object of the present invention to overcome the difficulties encountered in previously known procedures for milling insoluble dyes and pigments.

In the present invention, based upon a method which achieves satisfactory particle size reduction in short milling periods, the pebble or ball milling of the vat dye or pigment is carried out in the presence of a small amount of a fine water-insoluble grinding aid of certain hardness and particle size. The grinding aid is retained in the finished vat dye or pigment and need not be removed.

The use of this technique wherein grinding aids within a specific range of particle size and within a specific hardness range are employed, results in a material shortening of the milling period. Highly satisfactory results are obtained within a relatively short time by the process of this invention and even with pastes which could not be successfully reduced by prior art procedures even after an extended period of milling.

In the present process, an ordinary type of aggregate mill (i.e., a ball mill or a pebble mill) is used. To carry out the process, the pebble or ball mill, filled to from about 25% to about 60% but preferably about 50% by volume with balls or pebbles, is charged with the vat dye or pigment as an aqueous slurry. Usually about 100 to about 200% by volume of the pebble or ball void space is filled with dye or pigment. Then from about 0.25 to about 5% of the micro grinding medium based on the weight of the charge is added. The mill is then operated until the desired result is achieved.

The amount of the microgrinding medium, as stated, may vary from 0.25 to 5% by weight of the charge of slurry. From 1 to 2% is the normal amount. However, 3, 4 or even 5% or more may be required in certain instances where grinding is difficult.

Micro grinding media which are suitable, have a particle size of between about 400 and about 40 mesh, (i.e., between about 40 and about 420 microns) and a hardness of about 7 or more (Mohs' scale). It is desirable to use a medium which itself is ground down to a finer particle during the milling. This will tend to prevent undesirable grit in the finished dye paste. However, the particle size reduction of the micro medium should not take place too rapidly since the medium would then lose its effectiveness. The grinding medium to be effective should be a water-insoluble material of the stated particle size and hardness such as siliceous materials, e.g., fine sand, fine glass beads, fine quartz and other forms of silicon-containing products. To be effective, the grinding medium must fit within the definition as stated. Examples of materials which are not suitable are aluminum silicates of various particle sizes (5 microns to 0.2 micron), Carbosil (60 to 200 mesh), calcium carbonate, barium sulfate, diatomaceous earth, aluminum powder, iron powder, and titanium dioxide.

In normal usage, a siliceous material of a particle size smaller than about 100 mesh is preferred for reasons of both economy and efficiency.

The process of the invention effectively increases the through capacity of milling equipment because of the tremendous increase in grinding efficiency. It makes possible the milling of some dyes to meet particle size specifications where it had been previously impossible to do this at all. In addition it also enables milling to a finer particle size, thus permitting establishment of improved and more rigorous specification for dye particle size.

The process of the invention is effective for any type of insoluble dye or pigment. Examples of these are vat dyes of the anthraquinone type such as: CI–Vat Blue 20:59800, CI–Vat Black 25:69525, CI–Vat Blue 6:69825, CI–Vat Black 22, Vat Brown G Prototype 380 (Technical Manual of the American Assoc. of Textile Chem. and Col.) CI–Vat Orange 15:69025 and CI–Vat Blue 18:59815; and pigments such as CI–Pigment Yellow 14: 21095, CI–Pigment Red 4:12085, CI–Pigment Red 49: 15630, and CI–Pigment Blue 15:74160.

It is preferable to perform the milling step using the coloring material in the form of an aqueous paste. Such pastes are conventional and comprise the insoluble dye or pigment suspended in an aqueous medium containing other materials such as dispersants, humectants and biostats.

In order to determine whether the particle sizes are sufficiently small so that the paste is suitable for application purposes as stated above, a simple test has been devised. This test may be used after the paste has been milled, to determine whether milling has been carried out sufficiently to effect the desired finely divided state of the dye or pigment particle. This test is known as the dilute pigment filtration test (DPF test). To carry out the test, a sample of the vat dye or pigment is withdrawn during milling. The sample is slurried in a fixed amount of water, the temperature is adjusted and the slurry then filtered under vacuum under controlled conditions. The time required to pass the slurry through the paper is used as a measure of the effect of milling. A pigment or dye paste which has a DPF time of less than one minute is acceptable whereas one having a greater time is not.

The improvement effected by the process of the invention is very striking. This may be shown by comparing DPF values after milling. In many instances, for example, after milling by known procedures for a fixed period such as 16 hours, the paste is completely unsatisfactory as shown by very long DPF times, whereas after milling in the presence of microgrinding media for relatively short periods, the DPF test is easily met and the time for the DPF filtration is extremely small.

This invention is further illustrated by the following examples, in which, unless otherwise stated, parts are expressed on a weight basis.

EXAMPLE 1

Various types of vat dye pastes are subjected to the milling procedure and samples are removed for testing according to the DPF test. The details of the procedure and the details of the test are shown below. The results are indicated in the table.

*Milling Procedure*

A laboratory pebble mill containing 75 parts of ¼" flint pebbles is charged with dye, water and dispersing agent (Tamol N) to give about 10% by weight of dye solids. After the designated milling time, a sample is removed and evaluated by carrying out the DPF test. Varying types and amounts of micro milling media are added in runs before the milling is started.

*Evaluation Procedure (Dilute Pigment Filtration Test)*

A sample of the vat paste to be tested is withdrawn after milling and tested by the procedure as follows:

2.5 grams of the vat paste is slurried in 250 ml. of water and the temperature is adjusted to 80° C. The slurry is then filtered under vacuum by passing through an 11 centimeter Buchner funnel with two pieces of Whatman filter paper, a No. 4 on the bottom and a No. 2 on the top. The time required to pass the slurry through the filter papers is used as a measure of the vat dye paste milling efficiency. For practical purposes, a specification is set as requiring a maximum of 60 seconds filtration if the vat dye is considered to be sufficiently milled. Results of the various tests are shown in the following table:

EXAMPLE 2

To a commercial plant-size pebble mill half filled with ¼" flint pebbles (1060 parts), is charged the following:

192 parts of CI-Vat Black 22 presscake (disclosed in U.S. Patent 2,456,589)
6 parts of dispersing agent (Tamol N)
5 parts of 100 mesh silica
31 parts of water The mixture is milled for 11½ hours and the sample is then removed for testing by the DPF test (described in Example 1). The DPF time is 14 seconds.

A similar mixture, milled without the sand as a grinding assistant, gave an unsatisfactory DPF test even after 72 hours of milling.

EXAMPLE 3

Using a mill with pebbles similar to that described in Example 2, the following charge is used:

300 parts of CI-Vat Red 1:73,360 presscake
7 parts of dispersing agent (Tamol N)
4 parts of 400 mesh silica
100 parts of water After 12 hours' milling, a sample gives a DPF test time of about 21 seconds.

A similar mixture, milled without micromedia, gave a DPF test time of over 2 minutes after 42 hours' milling.

EXAMPLE 4

To a plant-size mill half filled with ¼" quartz pebbles (110 parts), is charged 30 parts of CI-Vat Black 25:69525 aqueous paste and 0.9 part of 100 mesh silica. After milling for 45 hours, a sample gives a DPF test time of 18 seconds.

Without the silica, it had previously not been possible to mill the same paste to a satisfactory test result.

EXAMPLE 5

In an aqueous pigment dispersion containing CI-Pigment Yellow 14:21095 (i.e., 3,3'-dichlorobenzidine, tetrazotized and coupled into 2 moles of acetoacet-o-toluidide) 1.5% Tamol and 0.35% carboxymethyl cellulose is pebble milled for periods of 24 and 48 hours respectively with and without micromedia to show the striking improvement in results obtained by the present invention.

When no micromedia was employed, after 24 hours of milling the DPF time was greater than five minutes. Even after 48 hours of pebble milling the DPF time was still greater than five minutes and thus the pigment was unacceptable. When 1 part of 400 mesh silica was added to a dispersion of the same composition, milling under otherwise identical conditions for periods of 24 and 48

| Vat Dye Paste | Procedure | Micro Grinding Medium | Amt., parts | Hours Milled | DPF Test Time, sec. | DPF Test Time Control Same Milling Time No Micro-Grinding Medium, min. |
| --- | --- | --- | --- | --- | --- | --- |
| 20 parts CI-69525 (23% solids) | Lab. Pebble Mill half full of ¼" flint pebbles (75 parts). | 200 mesh silica | 0.2 | 16.5 | 27 | 20 |
| 20 parts Vat Brown G Prototype 380 (29% solids). | do | do | 0.2 | 53 | 40 | 16 |
| 20 parts Vat Black 25-CI-69525 (23% solids). | do | 100-200 mesh silica. | 0.2 | 17 | 58 | 20 |
| Do | do | 60-90 mesh silica. | 0.2 | 17 | 29 | 20 |
| 20 parts Vat Black 25-CI-69525 (23% solids). | do | 400 mesh silica. | 0.2 | 16 | 16 | 20 |
| 29 parts Vat Black 25-CI-69525 (23% solids). | Pilot plant mill half full of ¼" flint pebbles (100 parts). | 200 mesh silica | 0.58 | 24 | 20 | 30 |
| 80 parts Vat Blue 20-CI-59800 | Pilot plant mill half full silica of ¼" flint pebbles (160 parts). | 100 mesh silica | 1.6 | 24 | 14 | 13 | hours resulted in a pigment which had DPF times of 25 seconds and 10 seconds, respectively.

Equally successful results were obtained when an aqueous dispersion of a phthalocyanine pigment was milled by the procedure of Example 5.

We claim:

1. In a method of aggregate milling insoluble coloring materials to reduce the particle size of said coloring material, the improvement which comprises milling an aqueous slurry of the coloring material in the presence of about 0.25 to about 5% of a water-insoluble grinding medium having a particle size between about 40 and 400 mesh and a Moh hardness of at least about 7.

2. The method of claim 1 wherein the insoluble coloring material is dispersed by means of a dispersant.

3. The method of claim 2 wherein the aggregate milling is pebble milling.

4. The method of claim 2 wherein the insoluble coloring material is a vat dye paste.

5. The method of claim 2 wherein the insoluble coloring material is a pigment slurry.

6. The method of claim 4 wherein the grinding medium is siliceous material having a particle size smaller than about 100 mesh.

References Cited in the file of this patent

UNITED STATES PATENTS

| | | |
|---|---|---|
| 1,837,772 | Hailwood et al. | Dec. 22, 1931 |
| 2,402,167 | Lang | June 18, 1946 |
| 2,737,460 | Werner | Mar. 6, 1956 |